(12) United States Patent
Mako et al.

(10) Patent No.: US 8,836,219 B1
(45) Date of Patent: Sep. 16, 2014

(54) RADIO FREQUENCY POWERED GAS-FILLED LAMPS

(76) Inventors: Elizabeth Marie Mako, Fairfax Station, VA (US); Frederick Michael Mako, Fairfax Station, VA (US)

(*) Notice: Subject to any disclaimer, the term of this patent is extended or adjusted under 35 U.S.C. 154(b) by 851 days.

(21) Appl. No.: 13/051,175

(22) Filed: Mar. 18, 2011

(51) Int. Cl.
*H01Q 1/26* (2006.01)
*H05B 41/24* (2006.01)

(52) U.S. Cl.
USPC ............................................. 315/34; 315/248

(58) Field of Classification Search
CPC ........ H05B 41/24; H01J 65/04; H01J 61/523; H01J 11/00
USPC ........ 315/34, 39, 49, 246, 248, 291; 313/234, 313/341, 490, 594, 607
See application file for complete search history.

(56) References Cited

U.S. PATENT DOCUMENTS

| | | | |
|---|---|---|---|
| 4,266,167 A * | 5/1981 | Proud et al. | 315/248 |
| 4,937,503 A * | 6/1990 | Sigai et al. | 315/248 |
| 8,384,300 B2 * | 2/2013 | Matloubian et al. | 315/248 |
| 2005/0122049 A1* | 6/2005 | Lee et al. | 315/39.51 |
| 2010/0171436 A1* | 7/2010 | DeVincentis et al. | 315/248 |

* cited by examiner

*Primary Examiner* — Jimmy Vu
(74) *Attorney, Agent, or Firm* — Hunton & Williams LLP

(57) ABSTRACT

A method and system for powering gas-filled lamps using radio and/or microwave frequencies is disclosed. The method and system may include a gas-filled lamp, an antenna positioned proximal to the gas-filled lamp, a conductive element surrounding the gas-filled lamp, and a power source connector coupled to the antenna.

26 Claims, 7 Drawing Sheets

RADIO FREQUENCY POWERED GAS-FILLED LAMPS

BACKGROUND

1. Field of the Art

The present exemplary embodiments relate to a system and method for powering gas-filled lamps using radio and/or microwave frequencies.

2. Description of the Related Art

Compact fluorescent lamps are a special type of fluorescent lamp designed for a condensed space. Compact fluorescent lamps are designed with dimensions and specifications which allow them to fit into existing light fixtures that are typically designed for traditional incandescent light lamps. Compact fluorescent lamps typically comprise: a gas-filled spiral tubular glass lamp, a ballast, and filaments. The gas-filled spiral tubular glass lamp typically contains a small amount of mercury, an inert gas such as argon, a phosphor coating, and other materials and gases. All of these substances are contained within the spiral tubular glass lamp under low pressure conditions compared to that of atmospheric pressure. Filaments coated with an oxide compound extend into the gas-filled spiral shaped glass lamp at each end. Each filament is also typically connected to an electronic ballast, which is coupled to the gas-filled spiral tubular glass lamp and forms the base of the compact fluorescent lamp. Often, electronic ballasts contain a small circuit board with electronic components for providing power to the lamp.

Typically, the electronic ballast connects to an alternating current ("AC") power source operating at a nominal voltage of 120 volts and a frequency of about 50-60 Hz, which powers the compact fluorescent lamp. Each filament receives current, through the ballast, thereby heating the filaments thus providing electrons to the gas filled spiral tubular glass lamp. Another voltage is applied to the filaments that drives electrons into the gas-filled spiral tubular glass lamp. The result of these voltage driven filament supplied electrons is that the originally neutral gas atoms and/or molecules undergo excitation and ionization within the gas. Due to the composition of the gases and substances within the spiral tubular glass lamp, this process results in the emission of light from the gas-filled spiral tubular glass lamp when the compact fluorescent lamp is provided power from a power source.

The filaments located within the compact fluorescent lamp operate by receiving electric current from the ballasted power supply. The electric current passes through the filament, creating heat and providing electrons. Voltage applied to the filaments forces electrons into the gas-filled region within the spiral tubular glass lamp, eventually resulting in light emission from the compact fluorescent lamp.

Compact fluorescent lamps provide advantages over traditional incandescent lamps. One advantage is that compact fluorescent lamps are capable of emitting the same amount of light as an incandescent lamp, while using much less power. Because they consume less power, under certain conditions, compact fluorescent lamps can give substantial energy cost savings when compared with standard incandescent light lamps. Furthermore, many compact fluorescent lamps comprise an Edison screw or a bayonet fitting, thereby making the compact fluorescent lamps compatible with many standard incandescent light fixtures.

While compact fluorescent lamps provide substantial energy efficiency benefits when compared with incandescent lamps, they are also more expensive to manufacture and purchase than incandescent lamps. Furthermore, compact fluorescent lamps have a limited switching life span compared to incandescent lamps. The switching life span (SLS) refers to the number of switch ON and switch OFF cycles. SLS is generally not quoted by the manufacturer, but instead the manufacturer quotes the constant ON time in hours. On average, compact fluorescent lamps have a limit of approximately 9,500 switching cycles before experiencing filament failure or burnout. Generally, filament failure or burnout occurs for one of two fundamental mechanisms: 1) sputtering erosion of the low work function oxide coating; or 2) breakage of the filament. Also, both mechanisms may occur in a single filament. Additionally, the ballast may fail but this occurs much less frequently than filament failure. Once filament failure or burnout occurs, the compact fluorescent lamp is inoperable or "dead" under standard AC operating power conditions. Accordingly, consumers are forced to purchase and replace the expensive compact fluorescent lamp.

Therefore, there is a need for an alternative system and method to operate standard compact fluorescent lamps after filament failure or burnout that is cost-effective, environmentally friendly, and energy efficient. The foregoing embodiments describe a method and system for powering and/or restoring compact fluorescent lamps using radio frequency (RF) power. The method and system described herein successfully restores compact fluorescent lamps that are inoperable or "dead" under standard AC operating conditions, which reduces landfill impact and the environmental impact of toxic mercury due to discarded lamps, in addition to maintaining energy efficiency.

The description herein of certain advantages and disadvantages of known methods and devices is not intended to limit the scope of the present invention. Indeed, the exemplary embodiments may include some or all of the features described above without suffering from the same disadvantages.

SUMMARY

In accordance with one embodiment, a system is provided for illumination of compact fluorescent lamps without filaments. The system comprises a compact fluorescent lamp, an antenna positioned proximal to the lamp, a conductive element that surrounds the lamp, and a power source connector coupled to the base of the antenna. An electric field is formed between the antenna coupler and the conductive element when a power source is connected to the system. The electric field interacts with gas molecules within the compact fluorescent lamp to generate illumination.

In accordance with another exemplary embodiment, a method is provided for "reviving" a compact fluorescent lamp. The method is comprised of producing an electric field and exposing the compact fluorescent lamp to the electric field, causing illumination. In an exemplary embodiment, the compact fluorescent lamp comprises inoperable filament(s). In another exemplary embodiment, the electric field is generated using a power source comprising a magnetron. In another exemplary embodiment, the electric field is generated by a condensed RF source which is located within the compact fluorescent lamp.

BRIEF DESCRIPTION OF THE DRAWINGS

Purposes and advantages of the exemplary embodiments will be apparent to those of ordinary skill in the art from the following detailed description together with the appended drawings, where like reference numerals are used to indicate like elements.

These and other exemplary embodiments and advantages will become apparent from the following detailed description, taken in conjunction with the accompanying drawings, illustrating by way of example the principles of the various exemplary embodiments.

DETAILED DESCRIPTION OF THE INVENTION

The following description is intended to convey a thorough understanding of the embodiments by providing a number of specific embodiments and details involving a system and method describing the operation of a compact fluorescent lamp with non-operating filaments or without filaments. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Terminology used for describing particular embodiments is not intended to limit the scope of any exemplary embodiments. As used throughout this disclosure, the singular forms "a," "an," and "the" include the plural, unless the context clearly dictates otherwise. Furthermore, if in describing some embodiments or features permissive language (e.g., "may") is used, that does not suggest that embodiments or features described using other language (e.g., "is," "are") are required. Unless defined otherwise, all terms have the same commonly understood meaning that one of ordinary skill in the art to which this invention belongs would expect them to have.

It should be understood that reference to the term "radio frequency" shall not be limited to any specific frequency. Those with skill in the art will readily understand that any number of frequencies including, including a broad range of both radio and microwave frequencies.

The accompanying figures and following description depict and describe exemplary embodiments of a system and method for the operation of compact fluorescent lamps with inoperable filaments or without filaments using RF power. Unless otherwise specifically disclosed, materials of the present invention may be selected from appropriate materials, such as metal, metal alloys, natural or manmade fibers, composites, and so on. Furthermore, with regard to the exemplary embodiments depicted below, any component that connects, mates, couples, or interacts with another component in an exemplary system shall not be limited to any particular type of connection. Rather, such a description is intended to encompass all known connections for the aforementioned elements as are known to those with ordinary skill in the art.

Figure 1:
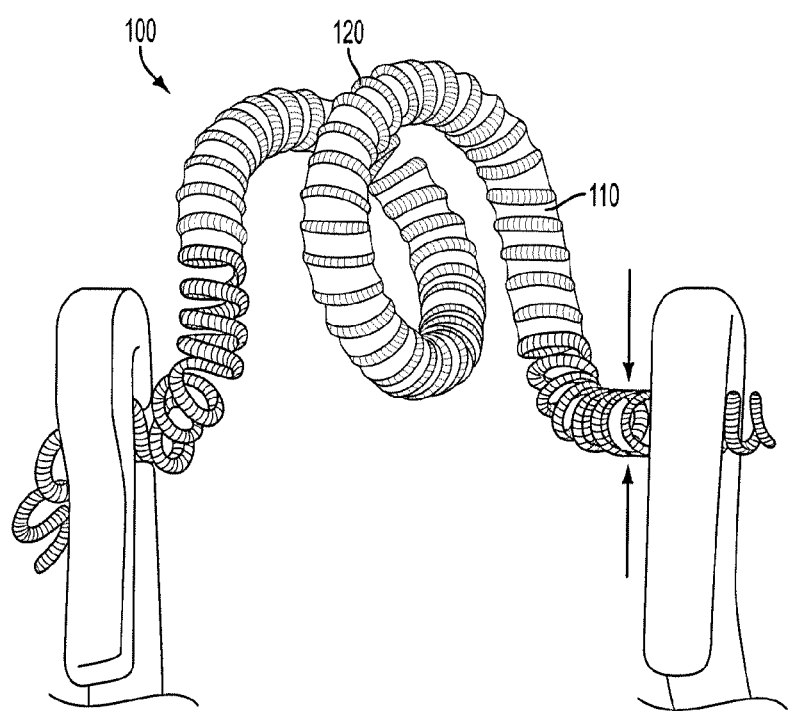
FIG. 1 depicts a compact fluorescent lamp filament loaded with a low work function oxide compound in accordance with an exemplary embodiment.

FIG. 1 depicts a standard 60 watt equivalent coated filament 100 commonly found within a gas-filled spiral tubular glass lamp portion (not shown) of a compact fluorescent lamp. The coated filament comprises a coil 110 and a coating 120 of low work function oxide compound. When connected to an energy source, the coated filament 100 heats and emits electrons. These electrons collide with atoms in the gas-filled spiral tubular glass lamp portion of the compact fluorescent lamp. These gases then interact with other substances contained within the gas-filled spiral tubular glass lamp portion of the compact fluorescent lamp (e.g., mercury and phosphor salts), causing the gas-filled spiral tubular glass lamp to emit visible light.

Generally, when a filament, such as coated filament 100 remains intact and properly coated, a compact fluorescent lamp will emit light when connected to a standard AC power supply. However, under switching conditions and over time, compact fluorescent lamps tend to burn out or "die" due to filament failure. Generally, there are two main mechanisms for filament failure: 1) sputtering erosion of the low work function oxide coating; or 2) breakage of the filament. Both failure mechanisms may occur as well. Once failure has occurred, the filament will not emit sufficient electrons, thereby causing the compact fluorescent lamp to be inoperable under standard AC power operating conditions. Yet even when such failure occurs, the gasses capable of illuminating the and remaining within the lamp-portion of the bulb are still operable.

Figure 2:
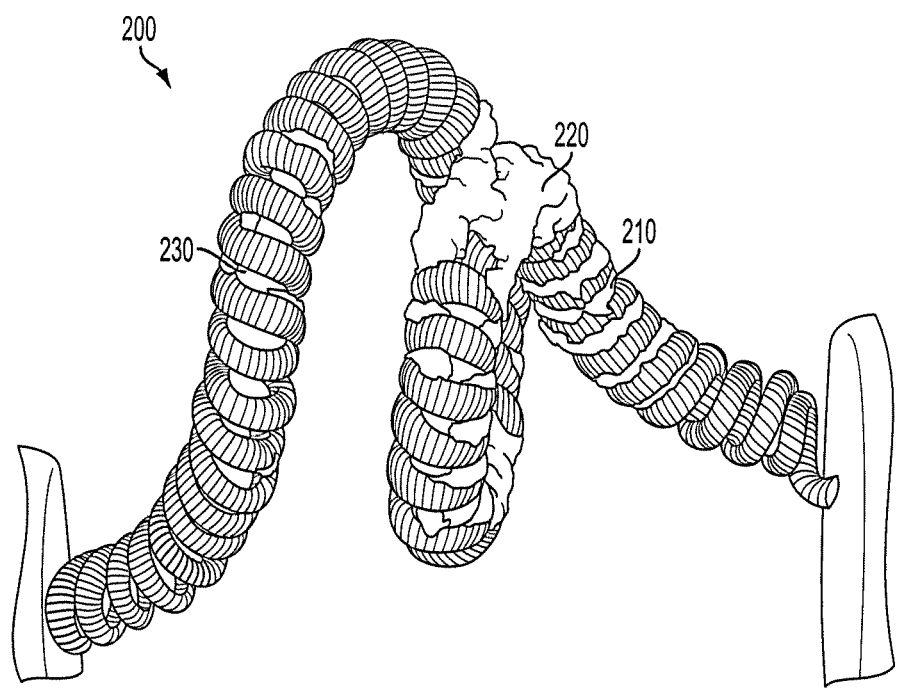
FIG. 2 depicts a compact fluorescent lamp filament failure in accordance with an exemplary embodiment.
Figure 3:
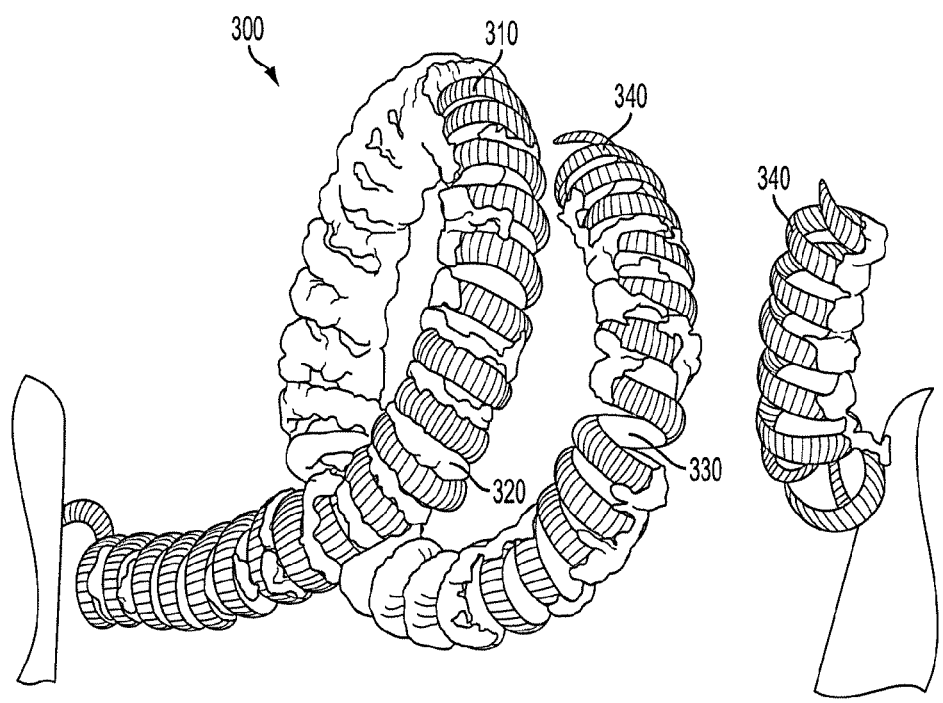
FIG. 3 depicts a compact fluorescent lamp filament failure in accordance with an exemplary embodiment.

FIGS. 2 and 3 depict exemplary filaments that have experienced failure or "burnout." FIG. 2 depicts an exemplary sputtering erosion failure of a coated filament 200. In this exemplary failure, the filament 210 has lost a large amount of its low work function oxide compound coating 220. At filament location 230, the filament 210 has no remaining coating. This exemplary failure prevents the emission of electrons from the filament, thereby preventing the compact fluorescent lamp from illuminating during normal operation under AC conditions. The failure depicted in FIG. 2 may have occurred for several reasons. Typically, such failures tend to occur as the filament and coating erode based on the age of the lamp, the amount of usage, and the number of switching cycles.

FIG. 3 depicts an exemplary filament failure comprising both sputtering erosion and breakage of the filament 300. In this exemplary filament failure, the filament 310 has lost a high percentage of its low work function oxide compound coating 320. At filament location 330, the filament 310 has no remaining coating. Moreover, the filament has broken at location 340. Both the sputtering erosion and filament breakage may occur during switching conditions or over time. In the exemplary failure shown in FIG. 3, the breakage will prevent current from passing through the filament when coupled to an AC power source, thereby preventing the filament from emitting electrons. Again, this failure may cause the compact fluorescent lamp to be inoperable under standard AC power operating conditions.

The filament failures depicted in FIGS. 2 and 3 are exemplary only. One of ordinary skill in the art will understand that other filament failures may occur to cause standard compact fluorescent lamps to become inoperable under standard AC power operating conditions. Moreover, one of ordinary skill in the art will appreciate that any number of other failures may occur, each of which will also prevent the compact fluorescent lamp from illuminating under standard AC operating conditions. After filament failure, the gases and physical substances that interact with the filament to illuminate the compact fluorescent lamp typically remain within the gas-filled spiral tubular glass lamp. Those with skill in the art will understand that the gasses and other materials remaining in the lamp-portion of the bulb would be capable of illuminating the bulb but-for the failure of the filament. Therefore, there exists a strong need to develop a system to produce illumination from compact fluorescent lamps after filament failure. Alternative means of producing illumination from such lamps may reduce landfill impact and toxic mercury in landfills, as well as maintaining energy efficiency.

Figure 4:
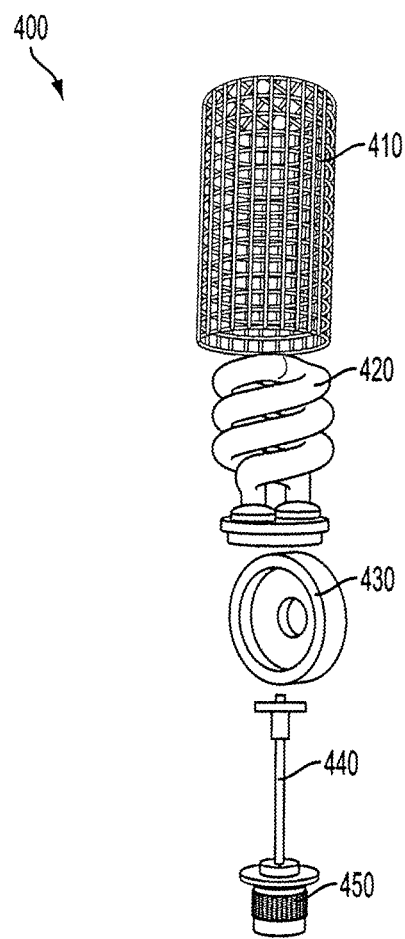
FIG. 4 depicts a broken-out version of a RF powered compact fluorescent lamp in accordance with an exemplary embodiment.

FIG. 4 depicts a broken-out view of an exemplary embodiment of a system 400 for producing illumination from a compact fluorescent lamp. In particular, the system 400 may comprise a conductive element 410, a gas-filled spiral tubular glass lamp 420, a lamp base 430 for coupling to the gas-filled spiral tubular glass lamp 420. The system 400 may also comprise an antenna coupler 440, which is coupled to a power source connector 450. The gas-filled spiral tubular glass lamp 420 may be formed in any shape or size. In one exemplary embodiment, the gas-filled tubular glass lamp 420 is spiral shaped, such that it primarily comprises a coiled tube having a spiral passageway (enclosed and containing the gas) and a hollow center region (exposed to the ambient air). In other exemplary embodiments, the gas-filled glass lamp 420 may comprise a straight tube (not shown). One of ordinary skill in the art will readily appreciate that the gas-filled tube may comprise any shape or size, to suit any of a variety of applications.

The antenna coupler 440 may be formed of any shape or size and may be coupled to the power source connector 450. In an exemplary embodiment, the antenna coupler 440, when assembled within the system 400, may extend into a hollow center region of gas-filled spiral tubular glass lamp 420. In other exemplary embodiments, antenna coupler 440 may extend along the periphery of gas-filled spiral tubular glass lamp 420. The antenna coupler 440 may be configured to receive power via the power source connector 450. In an exemplary embodiment, the power source connector 450 may comprise an N-type bulk head. In another exemplary embodiment, the power source connector 450 may comprise an SMA (2.4-3.5 mm)-type bulk head. In another exemplary embodiment, the power source connector 450 may comprise an GR-type bulk head. In another exemplary embodiment, the power source connector 450 may comprise an BNC-type bulk head. In another exemplary embodiment, the power source connector 450 may comprise a direct wire connection to the RF power source. It should be appreciated that the this configuration is exemplary only, and that any number of configurations may be used. For example, the antenna coupler 440 and the power source connector 450 may be integrally connected in one element. Those with skill in the art will understand that the antenna coupler 440 and power source connector 450 may comprise any number of forms to suit a wide variety of applications.

The conductive element 410 may be configured to surround the gas-filled spiral tubular glass lamp 420. Moreover, the conductive element 410 may be configured to interact with the antenna coupler 440 to create an electric field when power flows through the antenna coupler 440 via the power source connector 450. In an exemplary embodiment, the electric field formed between the antenna coupler 440 and the conductive element 410 may comprise a RF electric field. One of ordinary skill in the art will understand that the electric field formed between the antenna coupler 440 and the conductive element 410 may be adjusted in any number of ways. In one exemplary embodiment, the conductive element 410 may comprise a stainless steel cage. In other exemplary embodiment, the conductive element 410 may comprise other conductive materials, such as copper, silver, aluminum, or other metals. In an exemplary embodiment, the conductive element 410 may comprise an optically transparent material such as lucite, lexan, glass, quartz, sapphire, or ceramic that is metalized to reflect or contain RF power but mostly to transmit optical light. In another exemplary embodiment, the conductive element 410 may comprise an optically transparent material (e.g., lucite, lexan, glass, quartz, sapphire, or ceramic) coated with a transparent conducting oxide (e.g., tin-indium oxide, aluminum zinc oxide, gallium zinc oxide, indium zinc oxide) that is a RF reflector but an optical light transmitter. In another exemplary embodiment, the conductive element 410 may comprise an optically transparent material (e.g., lucite, lexan, glass, quartz, sapphire, or ceramic) coated with conducting carbon nano-tubes that forms a RF reflecting surface but allows optical light transmission. In another exemplary embodiment, the conductive element 410 may comprise an optically transparent material (e.g., lucite, lexan, glass, quartz, sapphire, or ceramic) coated with conducting polymers that form a RF reflecting surface but allows optical light transmission. In another exemplary embodiment, the conductive element 410 may comprise monolithic conducting polymers that form a RF reflecting surface but allows optical light transmission. Those with skill in the art will readily understand that any number of optically transparent materials may be utilized to permit illumination to pass through the conductive element but substantially restrict RF transmission.

When activated via a power source (not shown), the system 400 operates to produce illumination from the gas-filled spiral tubular glass lamp 420 by introducing the gas-filled spiral tubular glass lamp into the electric field formed between antenna coupler 440 and conductive element 410. The electric field interacts with the gases in the gas-filled spiral tubular glass lamp 420. This interaction creates a reaction where electrons interact with other substances in the gas-filled spiral tubular glass lamp to produce light. The reaction within the gas-filled spiral tubular glass lamp is similar to the reaction that occurs in the gas filled spiral tubular glass lamp during operation under standard AC conditions. However, when operating under AC conditions, the reaction is initiated by the production of electrons from the filament. In an embodiment of the present invention, the reaction is not initiated by electrons from the filament, but rather by the presence of the electric field formed between antenna coupler 440 and conductive element 410, which the gas-filled spiral tubular glass lamp 420 is exposed to. Accordingly, the presence and condition of a filament (not shown) is not necessary to produce illumination from the lamp. Rather, the present invention operates to produce illumination from a compact fluorescent lamp without the use of filaments.

In an exemplary embodiment, the intensity of the light emitted from the gas-filled spiral tubular glass lamp 420 will vary based upon the frequency of the electric field formed between the antenna coupler 440 and the conductive element 410. It may be desirable to cause the gas-filled spiral tubular glass lamp 420 to emit light at an intensity level that is similar to the light intensity of a compact fluorescent lamp operating under standard AC conditions. In an exemplary embodiment, the gas-filled spiral tubular glass lamp 420 may operate at two frequency regions: 560-625 MHz & 2280-2380 MHz. One of ordinary skill in the art will understand that the frequency of the RF electric field between antenna 440 and conductive element 410 may be adjusted to affect the intensity of the light emitted from the gas-filled spiral tubular glass lamp 420.

The system 400 may be powered by a number of means to create an electric field between antenna coupler 440 and conductive element 410. In an exemplary embodiment, system 400 receives power via power-source connector 450 to create a radio-frequency (RF) electric field between the antenna coupler 440 and the conductive element 410. One of ordinary skill in the art will readily appreciate the wide-array of power sources that may provide power to system 400 in order to create varying electric fields to power the gas-filled spiral tubular glass lamp 420 according to any number of desired applications.

Figure 5:
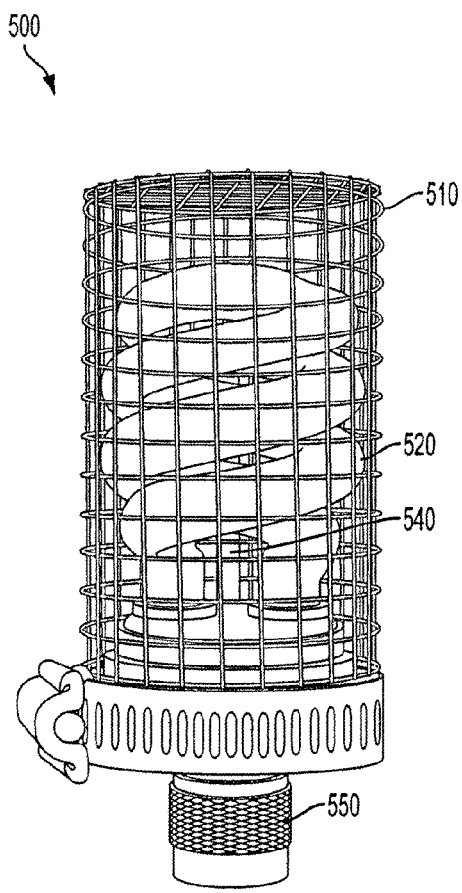
FIG. 5 depicts an assembled RF powered compact fluorescent lamp in accordance with an exemplary embodiment.

FIG. 5 depicts an assembled system 500 for producing illumination from a compact fluorescent lamp. The system 500 comprises elements similar to each of the elements described and depicted with regards to the broken-out depiction of system 400. In the exemplary embodiment shown in system 500, a spiral type gas-filled tubular glass lamp 520 is surrounded by a conductive element cage 510. An antenna coupler 540 is positioned within a hollow cavity of the spiral type gas-filled tubular glass lamp 520. The power source connector 550 is coupled to the antenna 540 and is configured to receive power from a power source and pass a voltage through the antenna coupler 540. The powered antenna coupler 540 operates in conjunction with the conductive element 510 to form an electric field. This electric field may affect the electrons within the gas-filled spiral tubular glass lamp 520 to produce illumination from the gas-filled spiral tubular glass lamp 520. As described with reference to FIG. 4 above, one of ordinary skill in the art will readily understand that the electric field may be adjusted in order to affect the light intensity that is emitted from gas-filled spiral tubular glass lamp 520.

In other exemplary embodiments, an RF power source may be integrated directly into a compact fluorescent lamp, which could serve to operate the compact fluorescent lamp without filaments. In other exemplary embodiments, an RF converter may be incorporated into traditional AC powered compact fluorescent lamps. In this exemplary embodiment, the RF converter may convert AC power into an RF signal to produce illumination from a compact fluorescent lamp without the use of filaments. One of ordinary skill in the art will understand that any type of power source or converter may be used to form the appropriate electric field for producing illumination from the gas-filled spiral tubular glass lamp without the use of filaments.

In other exemplary embodiments, a compact fluorescent lamp may comprise a gas-filled spiral tubular glass lamp and a socket portion comprising appropriate oscillators with or without amplifiers for providing an RF field. The gas-filled spiral tubular glass lamp may be surrounded by optically transparent (e.g. plastic, glass, ceramic) dome with for example, sputtered, sintered, vapor deposited or electroplated metal wires, strips or other patterns. The dome with sufficient metallization may form a conductive element, such as conductive element 410 and 510 discussed above with regards to FIGS. 4 and 5. In other exemplary embodiments, the gas-filled spiral tubular glass lamp may be enclosed within an optically transparent material such a tin-indium oxide. The tin-indium oxide may operates to transmit optical light and limit RF transmission, but also to serve as a conductive element, such as conductive element 410 and 510 discussed above with regards to FIGS. 4 and 5. The oscillators with or without amplifiers within the socket portion may operate to interact with the conductive element through an antenna coupler 440 and 540 when powered. In another exemplary embodiment, the socket portion may comprise an AC converter, which operates to convert AC power into RF power, thereby forming an electric field between the socket portion with antenna coupler 440 and 540 and the conductive element. In this exemplary embodiment, the invention is operable when coupled to an AC power source (not shown).

Figure 6:
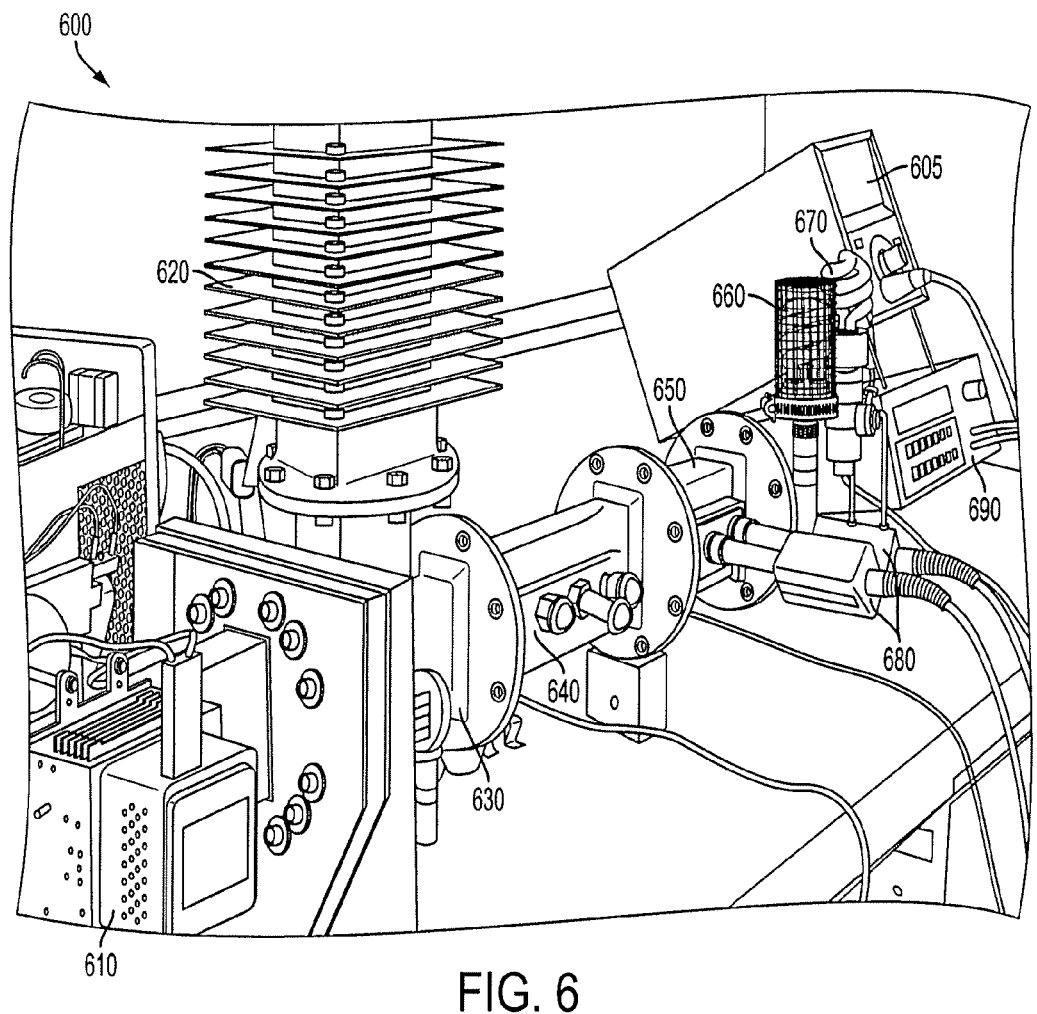
FIG. 6 depicts a system for testing compact fluorescent lamps in accordance with an exemplary embodiment.

FIG. 6 depicts a microwave system 600 for testing and powering compact fluorescent lamps. The system 600 may comprise a magnetron and wave launcher 610 or other RF source (e.g., klystron or travelling wave tube), a dummy load 620, a circulator 630, a triple stub tuner 640 and a bi-directional coupler 650. Further, the system 600 may also comprise an assembled system for producing illumination from a compact fluorescent lamp assembly 660, which is similar to the assembled system 500 described above with regard to FIG. 5. Moreover, the system 600 may also include an AC powered compact fluorescent lamp 670, incident and reflected power meter heads 680, incident power meter 690 and reflected power meter 605. System 600 operates to produce illumination from a compact fluorescent lamp assembly 660, which may be similar to system 500, described above with regard to FIG. 5. For the same reason as described above with regards to FIGS. 4 and 5, the compact fluorescent lamp assembly 660 may be powered according to system 600 with inoperable filaments or without filaments. Moreover, the system 600 operates to monitor and analyze the efficiency, light intensity and operating conditions related to the illumination of a gas-filled spiral tubular glass lamp via RF power.

The magnetron and wave launcher 610 may operate to generate RF power using the interaction of a stream of electrons with a magnetic field. The magnetron and wave launcher 610 may be configured in any number of ways to suit any number of applications. In one exemplary embodiment, the magnetron and wave launcher 610 may comprise an adjustable power 0-1300 watt, nominal 2.45 GHz magnetron. Although the 60 W compact fluorescent lamp operates from 0.5-25 watts, higher powers may be needed to simultaneously power multiple compact fluorescent lamps. The dummy load 620 is a device used as an absorber for reflected RF power. The dummy load 620 may consume RF electric energy and convert it into heat energy. The dummy load 620 may comprise cooling elements, such as fans or water-cooled elements. The dummy load 620 may be coupled to the magnetron and wave launcher 610, the circulator 630, the triple stub tuner 640, or any of the other elements of the system 600.

The triple stub tuner 640 may operate to match load impedances within the system 600 to provide for maximum power transfer between the magnetron and wave launcher 610 and a load. The triple stub tuner 640 may be configured in any number of ways to support any number of applications, and may be connected to any of the other elements of the system 600. The circulator 630 operates to receive and transmit the RF power from the magnetron and wave launcher 610 to the triple stub tuner 640 to the compact fluorescent lamp; any reflected power is transmitted to the circulator 630 and then to the dummy load 620. One of ordinary skill in the art will readily understand the benefits of employing a circulator, such as the circulator 630, to transmit the RF power from the magnetron and wave launcher 610 to the triple stub tuner 640, and direct reflected power to the dummy load 620.

The bi-directional coupler 650 may be coupled to the triple stub tuner 640, the incident and reflected power meter heads 690, the compact fluorescent lamp assembly 660 or any other component of system 600. The bi-directional coupler 650 may be configured to couple most of the transmission power to the compact fluorescent lamp assembly 660. Incident and reflected power meter heads 680 may be coupled to respective reflected power meter 605 and incident power meter 690 to monitor the incident and reflected power levels associated with the RF power going to and from the compact fluorescent lamp assembly 660. AC powered compact fluorescent lamp 670 may be positioned near compact fluorescent lamp assembly 660 to provide a visual comparison of the light intensity emission and duration between AC powered compact fluorescent lamp 670 and compact fluorescent lamp assembly 660. Moreover, light emission meters (not shown) may be provided to monitor, analyze or compare the light emission differences between the AC powered compact fluorescent lamp 670 and the compact fluorescent lamp assembly 660.

The components and configuration depicted in FIG. 600 are exemplary only, and one of ordinary skill in the art will readily understand that additional components may be added to the system, components may be removed from the system, and/or the components may be reconfigured to alter the power supply to the compact fluorescent assembly 660. Moreover, the system may be configured to provide power and monitoring capabilities for more than one compact fluorescent light assembly.

Figure 7:
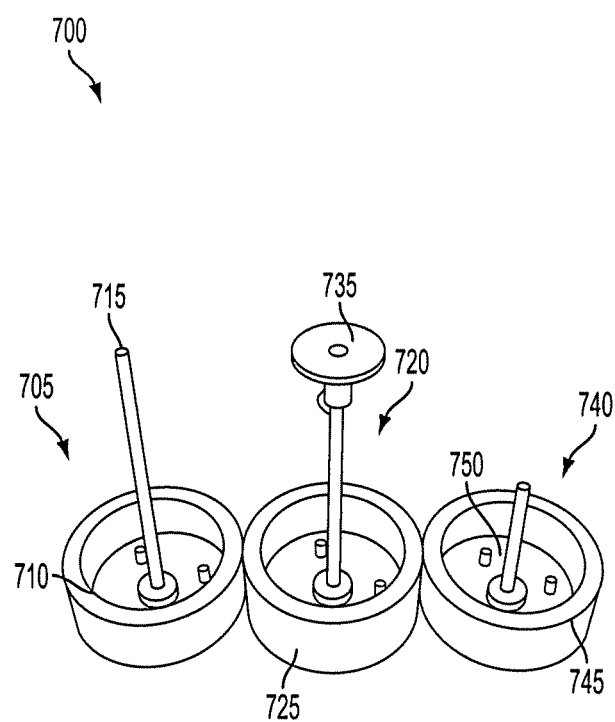
FIG. 7 depicts various exemplary compact fluorescent lamp antenna couplers in accordance with several exemplary embodiments.

FIG. 7, 700 depicts three exemplary antenna couplers 705, 720, 740, which may be similar to antenna couplers 440 and 540 discussed above with regard to FIGS. 4 and 5. As discussed with regard to antenna couplers 440 and 540, the antenna couplers 705, 720, and 740 may be configured for placement within any of the systems 400, 500, or 600 in order to interact with a conductive element, such as conductive elements 410 and 510 in order to create different electric fields when provided with power.

Exemplary antenna coupler 705 comprises a lamp base 710 and a long antenna coupler stem 715. Exemplary antenna coupler 720 comprises a lamp base 725, a long antenna coupler stem 715 and a disc 735. Exemplary antenna coupler 740 comprises a lamp base 745 and a short antenna coupler stem 750. Each of the exemplary antenna couplers 705, 720, and 740 may comprise a component of a system for the operation of compact fluorescent lamps with "dead" filaments or without the use of filaments, such as system 400, 500, and 600. The varying configuration and sizes of antenna couplers 705, 720, and 740 may be adjusted to suit varying applications. For instance, antenna coupler 740 may be better suited for use with a shorter gas-filled spiral tubular glass lamp. Conversely, antenna coupler 705 may be configured to illuminate a long and straight gas-filled spiral tubular glass lamp by being positioned along the lamp's periphery. One of ordinary skill in the art will readily understand that the configuration and placement of antenna couplers may be adjusted in any number of ways to suit any number of potential applications.

It should be understood that the following description is not limited to only compact fluorescent lamps. Rather, other gas-filled lamps, including any other type of fluorescent bulb, may be utilized in conjunction with the systems and methods described herein. Those with skill in the art will readily understand that there are a variety of ways to configure a gas-filled lamp to provide illumination according to the systems and methods described herein.

In the preceding specification, various exemplary embodiments have been described with reference to the accompanying drawings. It will, however, be evident that various modifications and changes may be made thereto, and additional exemplary embodiments may be implemented, without departing from the broader scope of the invention as set forth in the claims that follow. The specification and drawings are accordingly to be regarded in an illustrative rather than restrictive sense.

What is claimed is:

1. A system for providing illumination, comprising:
a gas-filled lamp
an antenna positioned proximal to the gas-filled lamp;
a conductive element, wherein the conductive element surrounds the gas-filled lamp; and
a power source connector, wherein the power source connector is coupled to the antenna;
wherein, the gas-filled lamp is a spiral-shaped compact fluorescent lamp and the antenna extends through a hollow middle region of the spiral-shaped compact fluorescent lamp.

2. The system of claim 1, further comprising a power source.

3. The system of claim 2, wherein the power source generates radio frequency waves for forming an electric field between the antenna and the conductive element.

4. The system of claim 2, wherein the power source generates microwaves for forming an electric field between the antenna and the conductive element.

5. The system of claim 1, wherein the power connector is a RF connector or a direct wire-type connection.

6. The system of claim 1, wherein the conductive element comprises a stainless steel cage.

7. The system of claim 1, wherein the conductive element is optically transparent.

8. The system of claim 1, wherein the antenna is an antenna coupler.

9. The system of claim 1, wherein the gas-filled lamp is a compact fluorescent lamp.

10. The system of claim 8, wherein the gas-filled lamp comprises inoperable filaments.

11. The system of claim 8, wherein the gas-filled lamp comprises no filaments.

12. The system of claim 1, wherein the antenna further comprises:
a conductive disc.

13. The system of claim 1, further comprising:
a base adapted to receive the gas-filled lamp.

14. The system of claim 2, wherein the power source is integrated within the gas-filled lamp.

15. The system of claim 1, further comprising:
an AC-to-RF converter.

16. The system of claim 2, wherein the power source comprises a magnetron.

17. The system of claim 1, wherein the antenna and power source connector are contained within a socket base, wherein the socket base is adapted to receive power from an AC power supply.

18. The system of claim 17, wherein the socket base further comprises:
an oscillator;
an amplifier;
and
a converter.

19. The system of claim 1, wherein the power connector is an N-type, SMA-type, GR-type, BNC-type RF connector.

20. The system of claim 1, wherein the conductive element is configured to limit RF transmission.

21. A method for reviving a gas-filled lamp, comprising:
generating an electric field between an antenna and a conductive element; and
exposing the gas-filled lamp to the electric field, wherein the gas-filled lamp is a spiral-shaped compact fluorescent lamp and comprises inoperable or no filaments, the antenna extends through a hollow middle region of the spiral-shaped compact fluorescent lamp, and the conductive element surrounds the gas-filled lamp.

22. The method of claim 21, wherein the electric field is generated using a power source comprising a magnetron.

23. The method of claim 22, wherein a plurality of gas-filled lamps are exposed to the electric field.

24. The method of claim 21 wherein the electric field comprises a frequency of 560-625 MHz.

25. The method of claim 21, wherein the electric field comprises a frequency of 2280-2380 MHz.

26. The method of claim 21, wherein the electric field is generated using an RF source that is integrated within the gas-filled lamp.

* * * * *